UNITED STATES PATENT OFFICE 2,490,780

PARA-AMINOBENZAMIDES, ACID ADDITION SALTS THEREOF, AND THEIR PRODUCTION

Raymond O. Clinton, Glendale, Calif., and Chester Merle Suter, Albany, N. Y., assignors to Sterling Drug Inc., Wilmington, Del., a corporation of Delaware No Drawing. Application May 27, 1947, Serial No. 750,888

14 Claims. (Cl. 260—294)

This invention relates to p-aminobenzamides, and salts thereof, wherein the amide nitrogen atom bears an alkamine substituent containing sulfur or oxygen, and to processes for preparing the same. It more particularly relates to N-tertiary - aminoalkylmercaptoalkyl - p-aminobenzamides and N - tertiary - amino - alkoxyalkyl-p-aminobenzamides and nitrogen-alkylated derivatives thereof, and water-soluble salts of the same.

Compounds of the above type have hitherto been unknown. We have discovered that they have valuable pharmacological properties. In particular these compounds are good local anesthetics, being in general distinguished by their effective pharmacodynamic qualities and their freedom from undesirable toxic manifestations and untoward reactions.

Among the compounds which comprise our invention are those which have the general formula

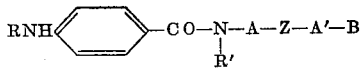

wherein R and R' represent hydrogen or lower alkyl radicals, A and A' represent lower alkylene radicals, Z is O or S, and B is a tertiary aliphatic amino group. The following are representative and illustrate our invention:

N - 2-(4-dipropylaminobutylmercapto) ethyl-p-amino-benzamide, having the formula

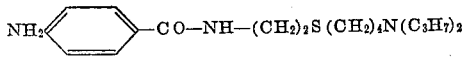

N - 2 - (2-ethylmethylaminoethylmercapto)-1-methylethyl-p-amino-benzamide of the formula:

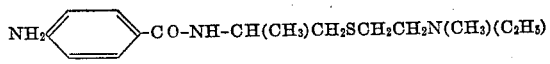

N -2-(2-N-pyrrolidinopropylmercapto) ethyl-p-ethylaminobenzamide of the formula:

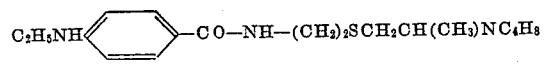

N - methyl-N-3-(2-butylethylaminopropylmercapto) propyl-p-n-butylaminobenzamide of the formula:

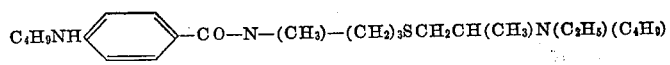

N - (3 - (2 - dibutylaminoethylmercapto) - 2 - methylpropyl) -p-amino-benzamide of the formula:

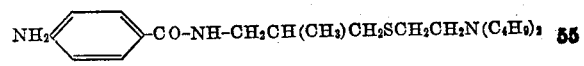

In any of the above compounds the sulfur atom may be replaced by oxygen.

The R and R' groups are lower alkyl radicals, such as methyl, ethyl, propyl, isopropyl, n-butyl, isobutyl, and amyl or hydrogen. Both R and R' can be hydrogen, the same or different alkyl radicals, or one can be hydrogen and the other an alkyl radical. A and A' represent lower alkylene radicals of two to five carbon atoms such as ethylene, trimethylene, tetramethylene, pentamethylene, 1,2-propylene, 1,2-butylene, 2,3-butylene and the like. The S (or O) linkage may be to one terminal position of the alkylene chain and the amino group may be linked to the other terminal position, or either or both types of substituents may be at intermediate positions on the alkylene chain. The grouping, B, represents a tertiary amino group of the following types: dialkylamino groups which may be expressed as NR''R''' wherein the alkyl radicals R'' and R''' vary from methyl through amyl and include both straight and branched-chains; aliphatic heterocyclic amino groups which may be expressed as N=R'''' wherein R'''' represents a divalent radical which, together with N, forms a cyclic tertiary amino radical such as the morpholino, piperidino, pyrrolidino, 2-methylpiperidino, 4-methylpiperidino, 2,6-dimethylpiperidino, piperazino and related aliphatic-type tertiary amino groups. These amino groups are all derived from secondary organic amines which are aliphatic in character. That is, they are derived from strong secondary amines, having ionization constants in the range of $1 \times 10^{-3}$ to $1 \times 10^{-6}$. They all behave chemically in a similar manner which is related to the chemical behavior of the simple dialkylamines such as diethylamine.

The compounds to which our invention relates can be prepared by reacting an oxygen- or sulfur-containing amine having the formula

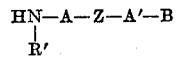

wherein R', A, A', Z, and B have the significance given hereinabove, with a p-nitrobenzoyl halide to form a p-nitrobenzamide of the type

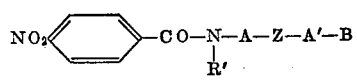

and subsequently reducing the nitro group to an amino group, the resulting compound having the formula

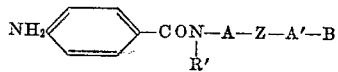

The sulfur-containing amines may be synthesized by reacting in the cold an aminoalkanethiol of the formula B—A'—ZH and a haloalkylamine hydrohalide, X—A—NHR'.HX, where X represents a reactive halogen (Cf. J. A. C. S., 65, 458 (1943); 67, 594 (1945)). Representative of this synthesis is the preparation of 2-(2-diethylaminoethylmercapto)diethylamine from 2-diethylaminoethanethiol and 2-bromodiethylamine hydrobromide:

$(C_2H_5)_2NCH_2CH_2SH + BrCH_2CH_2NHC_2H_5.HBr \rightarrow$
    $(C_2H_5)_2NCH_2CH_2SCH_2CH_2NHC_2H_5$ The oxygen-containing amines of the type $NH_2(CH_2)_3O$—A'—B may be obtained by the reaction of an amino alcohol, B—A'—OH, with acrylonitrile and subsequent reduction of the product (J. A. C. S., 66, 725 (1944)). The following reactions are typical:

$(C_2H_5)_2NCH_2CH_2OH + CH_2=CH-CN \rightarrow$
    $(C_2H_5)_2NCH_2CH_2OCH_2CH_2CN$
$(C_2H_5)_2NCH_2CH_2OCH_2CH_2CN + 2H_2 \rightarrow$
    $(C_2H_5)_2NCH_2CH_2OCH_2CH_2CH_2NH_2$ The reaction of p-nitrobenzoyl halides with the amines of the type NHR'—A—S—A'—B is preferably carried out in a suspension of an inert organic solvent, such as chloroform, and an aqueous solution of a base, such as sodium bicarbonate. Other suitable media include benzene and other inert solvents and pyridine.

The reduction of the nitro group of the p-nitrobenzamides of the formula

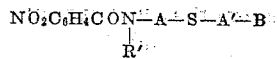

is preferably carried out by chemical methods. Among the chemical reducing agents that are suitable are iron and hydrochloric acid, ferrous sulfate and ammonia, tin and hydrochloric acid. The nitro group of p-nitrobenzamides of oxygen-interrupted amines of the type

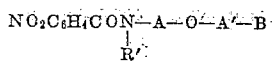

can be reduced chemically by the above methods or can be catalytically hydrogenated to the corresponding p-aminobenzamides. Suitable catalysts for this procedure include Raney nickel, platinum oxide and palladium black.

The p-aminobenzamides which comprise our invention may also be synthesized by the following procedures:

A lower alkyl p-nitrobenzoate is reacted with an oxygen- or sulfur containing amine of the type NHR'—A—Z—A'—B according to the equation:

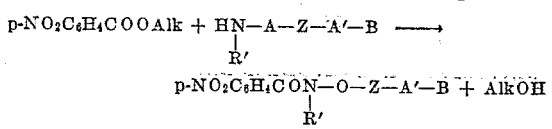

Alk represents an alkyl group and R', A, Z, A' and B have the significance given hereinabove. The p-nitro group is then reduced to amino by the methods herein disclosed.

A lower alkyl p-aminobenzoate or a salt thereof is condensed with an amine of the formula NHR'—A—Z—A'—B as shown by the following equation:

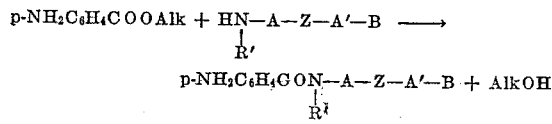

A p-acylaminobenzoyl halide is reacted with an amine of the formula NHR'—A—Z—A'—B as follows:

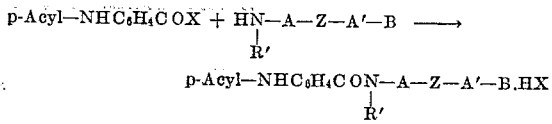

wherein Acyl represents a simple acyl group such as acetyl, benzoyl or the like, X represents halogen, and R', A, Z, A', and B have the meanings given hereinabove. The acyl group is subsequently removed by partial hydrolysis. If the acyl radical is a carbobenzoxy group, $C_6H_5CH_2OCO$— it may be removed by catalytic or chemical reduction, as with platinum catalysts or with sodium in liquid ammonia.

The N-substituted p-aminobenzamides which bear an alkyl substituent, R, on the p-amino group may be prepared by a variety of methods. In our preferred procedure, the alkyl group is introduced into the N-substituted p-aminobenzamide by reductive alkylation of an active carbonyl compound (viz., an aldehyde or ketone). An illustration is the introduction of a propyl group by treating the p-aminobenzamide with propionaldehyde in a reducing medium.

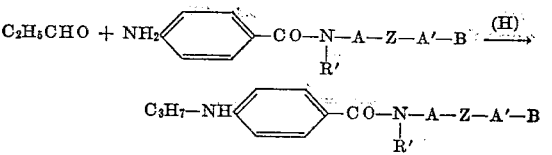

Another satisfactory method is to introduce the alkyl group directly by alkylation with alkylating agents such as methyl and ethyl sulfates, methyl and ethyl iodides and other lower alkyl halides (for example, the propyl, butyl and amyl chlorides, bromides and iodides). The desired monoalkyl derivatives may be separated from the dialkyl compounds by conversion to the acid-insoluble N-nitroso compounds and subsequent regeneration of the monoalkyl product by treatment with acid. In similar ways, the alkyl group may first be introduced with p-aminobenzoic acid or an ester thereof and the latter can then be converted into p-alkylaminobenzamides by the methods shown herein.

The tertiary aminoalkylmercaptoalkyl-p-aminobenzamides and tertiary-aminoalkoxyalkyl-p-aminobenzamides are moderately strong organic bases. They are soluble in organic solvents, only slightly soluble in water and soluble in dilute aqueous acids. They are convertible into water-soluble, neutral or weakly acidic salts with the common organic and inorganic acids, the anions of which are innocuous upon oral, parenteral or topical administration. These acids include hydrochloric, hydrobromic, hydriodic, sulfuric, sulfamic, phosphoric, tartaric, citric, boric, lactic, acetic and the like.

The following examples illustrate the compounds which comprise our invention and processes for preparing them. They are merely exemplary and in no way limit our invention.

Example 1

A. *N-2-(2-diethylaminoethylmercapto) ethyl-p-nitrobenzamide.*—To a stirred solution of 37.8 g. of sodium bicarbonate and 52.8 g. of 2-(2-diethylaminoethylmercapto)ethylamine in 240 cc. of water is added at room temperature during 1 hour a solution of 66.9 g. of p-nitrobenzoyl chloride in 600 cc. of dry chloroform. After an additional hour of stirring the chloroform layer is separated and the water layer extracted with an additional 50 cc. of chloroform. The combined chloroform extracts are washed with water, with dilute sodium bicarbonate solution or dilute alkali, and then with water, and finally dried with anhydrous calcium sulfate. Removal of the solvent by evaporation in vacuo leaves a pale yellow, oily residue of the amide in high yield.

B. *N-2-(2-diethylaminoethylmercapto) ethyl-p-aminobenzamide.*—A solution of 255 g. of ferrous sulfate heptahydrate in 900 cc. of water is heated to 80–85° C. and agitated vigorously. To it are added dropwise in 45 minutes a solution of 42.5 g. of N-2-(2-diethylaminoethylmercapto) ethyl-p-nitrobenzamide in 320 cc. of alcohol, and a solution of 135 cc. of 28% ammonium hydroxide in 150 cc. of water. The additions are maintained at such rates that the reaction mixture is always basic. After addition the mixture is agitated at 80–85° C. for an hour, the volume being maintained by the occasional addition of alcohol. The mass is filtered with a filter aid such as Filtercel and the filtrate is evaporated in vacuo until the alcohol is removed. The aqueous residue is made strongly alkaline with ammonium hydroxide and then extracted with ethyl acetate. The extracts are dried with anhydrous calcium sulfate and evaporated under reduced pressure (0.05 mm. at 60° C.). N-2-(2-diethylaminoethylmercapto)-ethyl-p-aminobenzamide is obtained in 77% yield. Upon crystallization from a mixture of ethyl acetate and hexane it forms small white prisms melting at 70–71° C. Its dipicrate forms bright yellow-orange needles melting at 132.5–135° C. The reduction can also be carried out by the following procedure: A mixture of 45.6 g. of the p-nitrobenzamide (Example 1A), 200 cc. of 50% aqueous alcohol and 11.9 cc. of concentrated hydrochloric acid is stirred and refluxed. To it is added in small portions 47.3 g. of reduced iron. After the addition the mixture is stirred and refluxed for 2 hours longer. The mass is filtered and the filter cake is washed with hot alcohol. The filtrate is evaporated under reduced pressure until the alcohol is removed. The aqueous residue is made basic with concentrated ammonia and then extracted with ethyl acetate. The ethyl acetate solutions are dried with anhydrous potassium carbonate, filtered and evaporated in vacuo. The residue of N-2-(2-diethylaminoethylmercapto(ethyl-p-aminobenzamide is crystallized from a mixture of ethyl acetate and hexane and melts at 69–70° C.

C. *N-2-(2-diethylaminoethylmercapto) ethyl-p-aminobenzamide dihydrochloride.*—The amide for Example 1B is dissolved in isopropyl alcohol. To this solution is added an excess of concentrated hydrochloric acid. The mixture is chilled and allowed to stand in the cold, whereupon white crystals of the hydrochloride are deposited. Recrystallization from isopropyl alcohol gives tiny, white prisms of the dihydrochloride, M. P. 172.5–174° C. It is readily soluble in water and has the structural formula

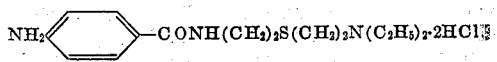

Example 2

*N-2-(2-diethylaminoethylmercapto) ethyl-p-n-butylaminobenzamide.*—A mixture of 59 g. of N-2-(2-diethylaminoethylmercapto) ethyl-p-aminobenzamide, 52.2 g. of pure zinc dust, 49.2 cc. of glacial acetic acid and 200 cc. of dry benzene is stirred and refluxed. To this mixture is added dropwise in 30 minutes a solution of 17.4 g. of n-butyraldehyde in 20 cc. of dry benzene. After addition the mixture is stirred and refluxed an additional hour. It is filtered while hot and the filter cake washed with hot benzene. The filtrate (two layers) is made strongly alkaline with 35% sodium hydroxide solution and the benzene layer is separated. The aqueous layer is extracted twice with benzene. The combined benzene extracts are dried, decolorized with charcoal and evaporated under pressure (0.05 mm. at 60° C. for 3 hours). N-2-(2-diethylaminoethylmercapto)ethyl-p-n-butylaminobenzamide is a viscous yellow oil. It has the structural formula

It forms a dipicrate which crystallizes from glacial acetic acid as small, yellow-orange prisms, M. P. 148–149° C.

When, in the above example, propionaldehyde is used instead of butyraldehyde, there is obtained N-2-(2-diethylaminoethylmercapto) ethyl-p-propylaminobenzamide. Similarly, the use of isobutyraldehyde results in the formation of N-2-(2-diethylaminoethylmercapto)ethyl-p-isobutylaminobenzamide.

Example 3

A. *2-(2-diethylaminoethylmercapto) diethylamine.*—2-hydroxydiethylamine is converted by 48% hydrobromic acid to 2-bromodiethylamine hydrobromide, M. P. 200–203° C. The latter is condensed with 2-diethylaminoethanethiol in methanol at −10° C. to form 2-(2-diethylaminoethylmercapto)diethylamine, B. P. 88.5° C. at 0.20 mm.; $n_D^{25}$ 1.4765.

B. *N-ethyl-N-2-(2-diethylaminoethylmercapto) ethyl-p-nitrobenzamide.*—2-(2-diethylaminoethylmercapto)diethylamine is reacted with p-nitrobenzoyl chloride at room temperature as disclosed in Example 1A. The resulting N-ethyl-N-2-(2-diethylaminoethylmercapto) ethyl-p-nitrobenzamide is a light oil. It forms a crystalline chloroplatinate of M. P. 154–155° C. (dec.).

C. *N-ethyl-N-2-(2-diethylaminoethylmercapto) ethyl-p-aminobenzamide* is obtained by the reduction of the corresponding p-nitrobenzamide (Example 3B) with ferrous sulfate and ammonia by the procedure of Example 1B. It is a light colored oil which forms a crystalline dipicrate of M. P. 133–133.5° C. It has the structural formula

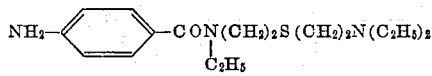

Example 4

A. *Dimethylaminoethylmercaptoethylamine* is prepared by reacting 0.5 mole of 2-bromoethylamine hydrobromide with 0.5 mole of 2-dimethylaminoethanethiol in the presence of 1 mole of sodium ethoxide in absolute ethanol at −10° C. It distils at 53° C. (0.04 m.m.); $n_D^{25}$ 1.4660.

B. *N-2-(2-dimethylaminoethylmercapto)ethyl-p-nitrobenzamide* is synthesized according to the procedure of Example 1A. It melts at 64–65° C. and its picrate melts at 156–157° C.

C. *N-2-(2-dimethylaminoethylmercapto)ethyl-p-amino-benzamide* is obtained by reducing the product of Example 4B with ferrous sulfate and ammonia as shown in Example 1B. It is a yellow oil which forms a crystalline water-soluble diphosphate melting at 133–135° C. It has the formula

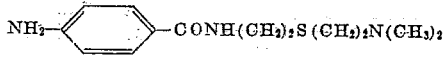

Example 5

A. *2-(3-diethylaminopropyl)mercaptoethylamine* is prepared by the reaction of 1 mole of 2-bromoethylamine hydrobromide with 1 mole of 3-diethylaminopropanethiol in the presence of 2 moles of sodium ethoxide in absolute alcohol at 10° C. It distils at 63.5° C. (0.04 mm.); $n_D^{25}$ 1.4882.

B. *N-2-(3-diethylaminopropyl)mercaptoethyl-p-nitrobenzamide* is obtained by the reaction of p-nitrobenzoyl chloride with the amine of Example 5A. It is a light yellow oil which forms a picrate of M. P. 111.5–112.5° C.

C. *N-2-(3-diethylaminopropyl)mercaptoethyl-p-aminobenzamide* is produced in high yield by the reduction of the corresponding p-nitrobenzamide (Example 5B) with ferrous sulfate and ammonia, as shown in Example 1B. It forms colorless crystals melting at 104–105.5° C. and its dipicrolonate melts at 117–118° C. It has the following formula

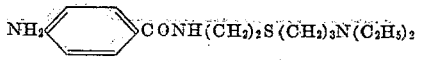

Example 6

A. *N-3-(2-diethylaminoethylmercapto)-propyl-p-nitrobenzamide* is prepared by reacting 3-(2-diethylaminoethylmercapto)-propylamine and p-nitrobenzoyl chloride in a mixture of sodium bicarbonate solution and chloroform, according to the procedure of Example 1A. The amide is formed in high yield as a light yellow oil. Its picrate melts at 120.5–123.5° C.

B. *N-3-(2-diethylaminoethylmercapto)-propyl-p-aminobenzamide* is produced by reducing the amide of Example 6A with ferrous sulfate and ammonia by the general method of Example 1B. It is a light yellow oil which forms a water-soluble crystalline citrate which melts with decomposition at 108–117° C. Its structural formula is

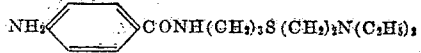

Example 7

A. *2-(2-dibutylaminoethylmercapto)ethylamine* is synthesized by reacting 1 mole of 2-dibutylaminoethanethiol with 1 mole of 2-bromoethylamine hydrobromide in the presence of 2 moles of sodium ethoxide in absolute alcohol at −10° C. It distils at 89.5° C. (0.01 mm.); $n_D^{25}$ 1.4813.

B. *N-2-(2-dibutylaminoethylmercapto-ethyl-p-nitrobenzamide* is prepared from the amine shown in Example 7A and p-nitrobenzoyl chloride by the general method of Example 1A. It is a yellow oil which forms a picrate of M. P. 79.5–80.5° C.

C. *N-2-(2-dibutylaminoethylmercapto)ethyl-p-aminobenzamide.*—The p-nitrobenzamide of Example 7B is reduced by the method of Example 1B to *N-2-(2-dibutylaminoethylmercapto)-ethyl-p-aminobenzamide,* having the formula

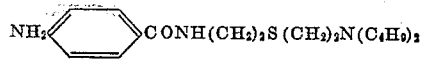

The latter forms a crystalline dipicrate of M. P. 94.5–95.5° C.

Example 8

A. *2-(N-piperidylethylmercapto)ethylamine* is prepared from 2-N-piperidylethanethiol and 2-bromoethylamine hydrobromide, according to the procedure of Example 5A. It distils at 81° C. (0.15 mm.); $n_D^{25}$ 1.5145

B. *N-2-(N-piperidylethylmercapto)ethyl-p-nitrobenzamide* is prepared by the method of Example 1A from p-nitrobenzoyl chloride and the amine of Example 8A. It forms white crystals of M. P. 69.5–70.5° C. and its picrate melts at 142–143° C.

C. *N-2-(2-N-piperidylethylmercapto)ethyl-p-aminobenzamide* is produced by the reduction of the p-nitrobenzamide of Example 8B with ferrous sulfate and ammonia, according to Example 1B. It forms nearly colorless crystals of M. P. 70.5–72.5° C. and it gives a white, crystalline, water-soluble dihydriodide which melts with decomposition at 210–212° C. It has the following structural formula

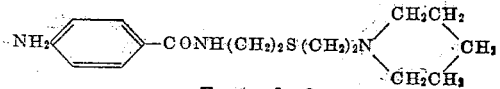

Example 9

A. *2-(3-N-piperidylpropylmercapto)ethylamine.*—3-N-piperidylpropanethiol (B. P. 93° C. (10 m. m.); $n_D^{25}$ 1.5000; prepared from 3-N-piperidylpropyl chloride and thiourea) is condensed with 2-bromoethylamine hydrobromide as in Example 4A. The resulting 2-(3-N-piperidylpropylmercapto) ethylamine distils at 100.5° C. (0.1 m. m.); $n_D^{25}$ 1.5118.

B. *N-2-(3-N-piperidylpropylmercapto)ethyl-p-nitrobenzamide* is produced by the reaction of p-nitrobenzoyl chloride on 2-(3-N-piperidylpropylmercapto) ethylamine (Example 9A), according to the procedure of Example 1A. It forms white crystals melting at 61.5–62.5° C. Its picrate melts at 115–115.5° C.

C. *N-2-(3-N-piperidylpropylmercapto)ethyl-p-aminobenzamide* is obtained by the ferrous sulfate and ammonia reduction of the corresponding p-nitrobenzamide (Example 9B). It forms white crystals which melt at 92.8–94.8° C. It has the structural formula

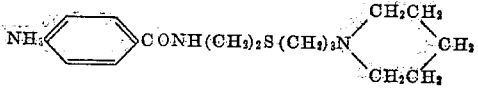

Its dihydriodide is soluble in water and melts with decomposition at 200° C.

Example 10

A. *2-(2-N-morpholinylethylmercapto)ethylamine.*—2-N-morpholinylethanethiol (B. P. 106° C. (12 mm.); $n_D^{25}$ 1.5025; prepared from 2-N-morpholinyl chloride and thiourea) is reacted with 2-bromoethylamine hydrobromide, as in Example 4A. The resulting 2-(2-N-morpholinylethylmercapto)ethylamine distils at 109° C. (0.25 m. m.); $n_D^{25}$ 1.5198.

B. *N-2-(2-N-morpholinylethylmercapto)-ethyl-p-nitrobenzamide* is prepared by the reaction of p-nitrobenzoyl chloride on the amine of Example 10A. It forms white crystals of M. P. 101.5–102° C. Its picrate melts at 145.5–146.5° C.

C. *N - 2 - (2 - N - morpholinylethylmercapto) - ethyl-p-aminobenzamide* is isolated as a yellow oil after the reduction of the corresponding p-nitrobenzamide (Example 10B) with ferrous sulfate and ammonia (see Example 1B). It has the following structural formula

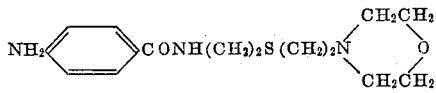

D. *N - 2 - (2 - N - morpholinylethylmercapto) - ethyl-p - aminobenzamide dihydrochloride.*—The free base (Example 10C) is dissolved in absolute ethanol and treated with excess dry ethereal hydrogen chloride (6 N). On chilling crystals of the dihydrochloride separate and are removed by filtration. Recrystallization from absolute ethanol diluted with petroleum ether gives white crystals of the dihydrochloride melting at 236–238.5° C. The crystals are readily soluble in water.

*Example 11*

A. *N - 3 - (3 - diethylaminopropylmercapto) - propyl - p - nitrobenzamide* is synthesized from 3 - (3 - diethylaminopropylmercapto) - propylamine (B. P. 86–87° C. (0.04 mm.); $n_D^{20}$ 1.4880; prepared from 3-diethylaminopropanethiol and 3-bromopropylphthalimide) and p-nitrobenzoyl chloride, according to the method shown in Example 1A. The product is a light yellow oil which forms a crystalline picrate of M. P. 102.5–105° C.

B. *N - 3 - (3 - diethylaminopropylmercapto) - propyl-p-aminobenzamide* is prepared by the reduction of the corresponding p-nitrobenzamide (Example 11A) according to the procedure of Example 1B, using ferrous sulfate and ammonia. It is a light yellow oil, a sample of which on analysis was found to contain 4.17% N and 9.51% S (the calculated values are 4.33% N and 9.89% S). It has the structural formula

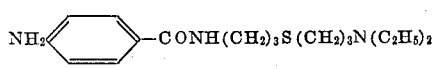

*Example 12*

A. *2 - (2 - diethylaminoethoxy) ethylamine.*—A solution of 1 mole of 2-chloroethyl 2'-phthalimidoethyl ether with 3 moles of diethylamine in 1500 cc. of alcohol is refluxed for 30 hours and then evaporated in vacuo to dryness. The residue is taken up in water and extracted with three 200-cc. portions of ether. The ether solution is evaporated and the resulting 2-(2-phthalimidoethoxy) ethylamine is cleaved with hydrazine hydrate (Ing and Manske, J. Chem. Soc., 2348 (1926)). 2-(2-diethylaminoethoxy) ethylamine distils at 78° C. (4 mm.); $n_D^{25}$ 1.4430.

B. *N - 2-(2-diethylaminoethoxy) ethyl-p-nitrobenzamide.*—One mole of 2 - (2 - diethylaminoethoxy) ethylamine in an aqueous solution of a 1.5 moles of sodium bicarbonate is treated with a 1.2 moles of p-nitrobenzoyl chloride in chloroform, as in Example 1A. From the chloroform layer, after washing with dilute bicarbonate solution and evaporation, is obtained N-2-(2-diethylaminoethoxy) - ethyl-p-nitrobenzamide, melting at 51.5–52° C. and forming a flavionate of M. P. 190.5–192° C.

C. *N - 2 - (2 - diethylaminoethoxy(ethyl - p - aminobenzamide* is prepared from the corresponding p-nitrobenzamide (Example 12B) by reduction with ferrous sulfate and ammonia, according to the directions given in Example 1B. It forms white crystals which melt at 67.5–68.5° C. It has the formula

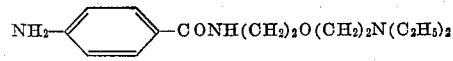

D. *N - 2 - (2 - diethylaminoethoxy) ethyl - p - aminobenzamide dihydrochloride.*—The base (Example 12C) is taken up in isopropyl alcohol and treated with excess dry ethereal hydrogen chloride. The precipitated dihydrochloride may be crystallized from isopropyl alcohol or from a mixture of alcohol and ethyl acetate, and melts at 177–179° C. The crystalline dihydrochloride is easily soluble in water.

*Example 13*

A. *N-3-(2-diethylaminoethoxy) propyl-p-nitrobenzamide* is obtained by reacting p-nitrobenzoyl chloride with 3-(2-diethylaminoethoxy) propylamine according to the procedure of Example 12B. It is a light yellow oil which forms a picrate of M. P. 113.5–114.8° C.

B. *N-3-(2-diethylaminoethoxy) propyl-p-aminobenzamide* is prepared by reducing the corresponding p-nitrobenzamide (Example 13A) with ferrous sulfate in ammoniacal solution, as disclosed in Example 1B. It is isolated as a light-colored oil which forms a water soluble citrate of M. P. 111–111.5° C. Its structural formula is

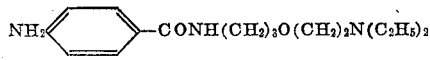

*Example 14*

A. *N-3-(3-diethylaminopropoxy) propyl - p - nitrobenzamide* is synthesized by the reaction of p-nitrobenzoyl chloride on 3-(3-diethylaminopropoxy) propylamine by the general method disclosed in Example 12B. It is a light-colored oil which forms a picrate which melts at 94.5–95.5° C.

B. *N - 3 - (3 - diethylaminopropoxy) propyl - p - aminobenzamide* is obtained from the corresponding p-nitrobenzamide (Example 14A) by reduction according to the procedure of Example 1B. It is a light-colored oil and a sample was found to contain 4.56% N (calculated, 4.56% N). It has the structural formula

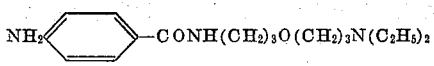

*Example 15*

*N-ethyl - N-2-(2-diethylaminoethylmercapto) - ethyl-p-n-amylaminobenzamide* is prepared by reductively amylating 1 mole of N-ethyl-N-2-(2-diethylaminoethylmercapto) ethyl-p-aminobenzamide (Example 3C) by refluxing with 4 moles of zinc dust and 4.1 moles of glacial acetic acid in dry benzene while 1.2 moles of n-valeraldehyde in dry benzene is added, according to the method of Example 2. The desired amide is separated in the benzene layer after filtration and alkalization of the reaction mixture. It is isolated from the purified benzene solution by evaporation and has the structural formula

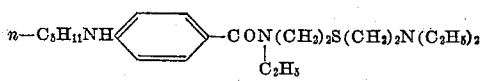

What we claim is:

1. A compound having the formula

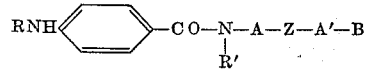

wherein R and R' represent members of the group consisting of hydrogen and lower alkyl radicals, A and A' are lower alkylene radicals; Z is a member of the group consisting of O and S, and B is a dialkylamino group, in which the alkyl groups attached to the amino group may be joined to form a heterocyclic radical of the group consisting of piperidines, morpholines, pyrrolidines and piperazines, and water-soluble acid-addition salts thereof.

2. A compound having the formula

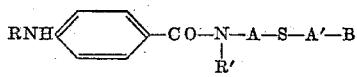

wherein R and R' represent members of the group consisting of hydrogen and lower alkyl radicals, A and A' are lower alkylene radicals and B is a dialkylamino group, in which the alkyl groups attached to the amino group may be joined to form a heterocyclic radical of the group consisting of piperidines, morpholines, pyrrolidines and piperazines, and water-soluble acid-addition salts thereof.

3. A compound having the formula

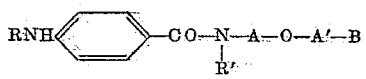

wherein R and R' represent members of the group consisting of hydrogen and lower alkyl radicals, A and A' are lower alkylene radicals and B is a dialkylamino group, in which the alkyl groups attached to the amino group may be joined to form a heterocyclic radical of the group consisting of piperidines, morpholines, pyrrolidines and piperazines, and water-soluble acid-addition salts thereof.

4. A tertiary - aminoalkylmercaptoalkyl - p - aminobenzamide having the formula

wherein A and A' represent lower alkylene radicals and B represents a dialkylamino group, in which the alkyl groups attached to the amino group may be joined to form a heterocyclic radical of the group consisting of piperidines, morpholines, pyrrolidines and piperazines, and its water-soluble acid-addition salts.

5. A tertiary - aminoalkoxyalkyl-p-aminobenzamide having the formula

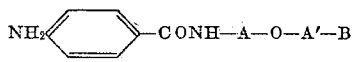

wherein A and A' represent lower alkylene radicals and B represents a dialkylamino group, in which the alkyl groups attached to the amino group may be joined to form a heterocyclic radical of the group consisting of piperidines, morpholines, pyrrolidines and piperazines, and its water-soluble acid-addition salts.

6. A tertiary - aminoalkylmercaptoalkyl - p - aminobenzamide having the formula

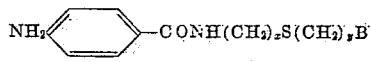

wherein $x$ and $y$ are integers from 2 to 5 and B is a dialkylamino group, in which the alkyl groups attached to the amino group may be joined to form a heterocyclic radical of the group consisting of piperidines, morpholines, pyrrolidines and piperazines, and its water-soluble acid-addition salts.

7. A tertiary - aminoalkoxyalkyl-p-aminobenzamide having the formula

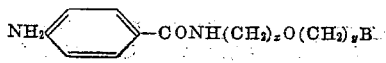

wherein $x$ and $y$ are integers from 2 to 5 and B is a dialkylamino group, in which the alkyl groups attached to the amino group may be joined to form a heterocyclic radical of the group consisting of piperidines, morpholines, pyrrolidines and piperazines, and its water-soluble acid-addition salts.

8. A dialkylaminoalkylmercaptoalkyl-p-aminobenzamide having the formula

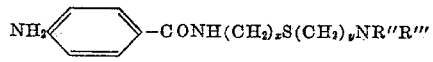

wherein $x$ and $y$ are integers from 2 to 5 and R'' and R''' are lower alkyl radicals, and its water-soluble acid-addition salts.

9. A heterocyclic - aminoalkylmercaptoalkyl-p-aminobenzamide having the formula

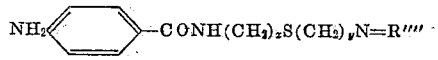

wherein $x$ and $y$ are integers from 2 to 5 and R'''' is a divalent radical which, together with N, forms a cyclic tertiary-amino radical being selected from the group consisting of piperidines, morpholines, pyrrolidines and piperazines; and its water-soluble acid-addition salts.

10. N-2-(2 - diethylaminoethylmercapto) ethyl-p-aminobenzamide, having the formula

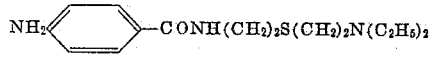

and its water-soluble acid-addition salts.

11. N-2-(2-N-piperidylethylmercapto) ethyl-p - amino-benzamide, having the formula

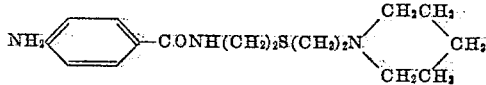

and its water-soluble acid-addition salts.

12. In a process for preparing a compound of the formula

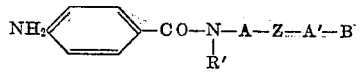

wherein R' represents a member of the group consisting of hydrogen and lower alkyl radicals, A and A' are lower alkylene radicals, Z is a member of the group consisting of O and S, and B is a dialkylamino group, in which the alkyl groups attached to the amino group may be joined to form a heterocyclic radical of the group consisting of piperidines, morpholines, pyrrolidines and piperazines, the step which comprises chemically reducing with ferrous sulfate and ammonia the nitro group of a p-nitrobenzamide having the formula

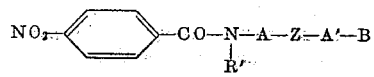

by heating a mixture of said reactants.

13. In a process for preparing N-2-(2-diethylaminoethylmercapto) ethyl-p - aminobenzamide, having the formula

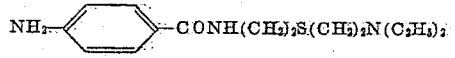

the step which comprises chemically reducing with ferrous sulfate and ammonia the nitro group of the corresponding N-2-(2-diethylaminoethylmercapto) ethyl-p-nitrobenzamide by heating a mixture of said reactants.

14. In a process for preparing N - 2 - (2 - N - piperidylethylmercapto)ethyl - p - aminobenzamide, having the formula

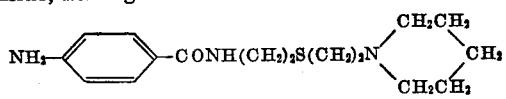

the step which comprises chemically reducing with ferrous sulfate and ammonia the nitro group of the corresponding N-2-(2-N-piperidylethylmercapto)ethyl-p-nitrobenzamide by heating a mixture of said reactants.

RAYMOND O. CLINTON.
CHESTER MERLE SUTER.

REFERENCES CITED

The following references are of record in the file of this patent:

UNITED STATES PATENTS

| Number | Name | Date |
|---|---|---|
| 2,073,100 | Eisleb | Mar. 9, 1937 |
| 2,323,075 | Orthner et al. | June 29, 1943 |

Certificate of Correction

Patent No. 2,490,780                                                                December 13, 1949

RAYMOND O. CLINTON ET AL.

It is hereby certified that errors appear in the printed specification of the above numbered patent requiring correction as follows:

Column 3, line 67, for that portion of the equation reading "CON-O-Z" read *CON-A-Z*; column 8, line 6, for "dipictrate" read *dipicrate*; line 56, for that portion of the formula reading "NH$_3$" read *NH$_2$*; column 10, line 29, for "M. P. 111–111.5° C." read *M. P. 111–113.5° C.*;

and that the said Letters Patent should be read with these corrections therein that the same may conform to the record of the case in the Patent Office.

Signed and sealed this 4th day of April, A. D. 1950.

[SEAL]

THOMAS F. MURPHY,
*Assistant Commissioner of Patents.*